US007751977B2

(12) United States Patent
Winkler et al.

(10) Patent No.: US 7,751,977 B2
(45) Date of Patent: Jul. 6, 2010

(54) REAL TIME ENVIRONMENTAL MEASUREMENT AND REPORTING SYSTEM FOR NAVIGABLE WATERWAYS AND METHOD OF USE

(75) Inventors: Michael F. Winkler, Vicksburg, MS (US); W. Scott Noble, Franklin, TN (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 86 days.

(21) Appl. No.: 11/822,756

(22) Filed: Jul. 10, 2007

(65) Prior Publication Data

US 2009/0018774 A1    Jan. 15, 2009

(51) Int. Cl.
*G06F 17/40* (2006.01)
*G06F 17/00* (2006.01)

(52) U.S. Cl. .............. 702/3; 702/1; 701/21; 701/200
(58) Field of Classification Search ................ 702/3, 702/1, 50
See application file for complete search history.

(56) References Cited

U.S. PATENT DOCUMENTS

| 5,088,859 | A | 2/1992 | Devlin |
| 5,303,207 | A | 4/1994 | Brady et al. |
| RE35,535 | E | 6/1997 | Brumley et al. |
| 6,097,671 | A | 8/2000 | Merewether |
| 6,453,256 | B1 | 9/2002 | Gordon et al. |
| 6,522,301 | B2 | 2/2003 | Takayama et al. |
| 6,850,173 | B1 * | 2/2005 | Steinbrecher ............... 340/984 |
| 2008/0079608 | A1 * | 4/2008 | Morrell ..................... 340/984 |
| 2008/0086267 | A1 * | 4/2008 | Stolte et al. ................. 701/300 |
| 2008/0147257 | A1 * | 6/2008 | Kuhlgatz et al. ............. 701/21 |
| 2008/0258960 | A1 * | 10/2008 | Rosenberg et al. ........... 342/41 |

OTHER PUBLICATIONS

Ojo et al., "Coastal Observing Systems: Addressing Science while Fulfilling the Needs of Regulators, Managers and Stakeholders", 2006, IEEE, 6 pages.*
Bradley, "Horizontal ADCP for Remote Mapping of Currents", 1999, IEEE, pp. 103-107.*
Devine, "Avoiding biased data during real time HADCP data collection", 2005, IEEE, pp. 137-141.*

* cited by examiner

*Primary Examiner*—Hal D Wachsman
(74) *Attorney, Agent, or Firm*—Earl H. Baugher, Jr.

(57) ABSTRACT

COTS devices are integrated into a system employing custom software and custom hardware and software interfaces to collect and communicate data concerning current flows around fixed structure (e.g., inland locks, bridges, harbor structures, etc.) in various bodies of water (e.g., inland waterways, harbors, canals, etc.). Embodiments comprise: sensors and communications equipment, for example wireless systems that transmit sensor data to a lock house; lock house communications equipment that receive sensor data; a processor, e.g., a personal computer, with installed custom software and interface for processing data; an Automatic Identification System (AIS) transponder interfaced to the processor; an AIS installed in vessels to include an electronic vector chart display, such as may be installed in a towboat pilothouse; and an optional web-based database application for lock operators to record dam operation scenarios that may be used in research, investigations, and the like.

20 Claims, 5 Drawing Sheets

REAL TIME ENVIRONMENTAL MEASUREMENT AND REPORTING SYSTEM FOR NAVIGABLE WATERWAYS AND METHOD OF USE

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This patent has multiple assignees.

BACKGROUND

The inland waterway system of the United States is an important transportation resource. In 2004 over 625 million tons of cargo was moved over it using 1% of the total fuel consumption for freight transport of 16% of the nation's freight. (*The U.S. Waterway System—Transportation Facts*, U.S. Army Corps of Engineers, 2005). (*National Transportation Statistics*, Bureau of Transportation Statistics (BTS), Tables 4-5 and 5-7, 2006). Further, inland maritime transportation relies on passage through 212 locks. (U.S. Army Corps of Engineers, 2005).

"Outdrafts," artificially induced currents directed away from a dam, are created by the actuation of dams. Tow pilots approaching navigation locks around a dam compensate for the outdraft to avoid hitting lock walls.

Not compensating for outdrafts may result in accidents that cause injury or loss of life and property as well as damage to embankments. (*Waterways Action Plan, Joint Project of the Marine Industry*, U.S. Coast Guard and U.S. Army Corps of Engineers, 2006). For example, the Elizabeth M. was exiting the Montgomery Locks northbound on the Ohio River on Jan. 9, 2005. The lead two barges in tow broke loose after being caught in an outdraft estimated at 13-15 mph. When the pilot tried to correct, the tow and barges were swept into the dam, killing four crew members. (*News Summary for January 17-23, 2005, The Waterways Journal*, 2005).

Other accidents have resulted in barges obstructing inland maritime traffic. The M/V James Buky blocked the lock at the Cannelton Dam in January 1991 and the M/V Captain Bill blocked the lock at the Smithland Dam in April 2005. In each case, barges broke free as a result of improper compensation for the outdraft. In all cases, knowledge of the outdraft will insure efficient approaches, providing tow pilots with the necessary time to compensate for outdraft.

Refer to FIG. 1 showing the prior art, i.e., lack of a formal outdraft notification system. In practice, a vessel (not shown separately) navigating downstream in the direction of the arrow 107 approaches a lock chamber 106 at a dam 104 through a channel 103 bordered by walls 101, 102 that act to align the vessel with the lock chamber 106. Guard walls 102, located in the upper (upstream) lock approach, protect vessels against an induced current (not shown separately) created by discharges downstream from the dam 104. Guide walls 101 "guide" vessels into the channel 103 on the downstream passage and align vessels with lock entry through gates 105 on the upstream passage.

Refer to FIG. 2 showing the prior art (from an overhead perspective), i.e., lack of a formal outdraft notification system. There may be an increased hazard to navigation created by outdraft 201 of unknown amplitude and direction at the Guard wall 102. This "unknown" (i.e., unmeasured and unreported) outdraft 201 makes it more difficult to maneuver a tow being "pushed" downstream by the river.

A towboat traveling on a downriver course (arrow 107) reduces speed to less than one knot in order to safely align with the lock chamber 106 and avoid impact with the Guard wall 102. In an upper lock approach, water flows across the lock and towards the dam 104, forming a cross current 201 for which a pilot must compensate. Typically, this current is generated by a gated spillway section of the dam 104 that controls discharges downstream. This cross current 201, commonly called outdraft current or simply outdraft 201, directs the bow of the tow or barge toward the spillway of the dam 104, altering the effects of the "normal" downstream current that is known to the pilot.

Presently, estimating velocity and direction of outdrafts is accomplished by fixed objects such as buoys. Navigating through outdraft by feel alone is not sufficient to reduce risk, however. Moreover, existing communication methods, such as large signs displaying "outdraft present" as well as informal discussions between passing tow pilots, do not quantify the direction and speed of the outdraft.

Velocity of a current, including those generated as outdraft 201, may be measured using Acoustic Doppler Current Profiling (ADCP). ADCP employs the Doppler Effect, transmitting short pulses of electromagnetic energy at acoustic wavelengths and receiving echoes thereof. Echoes return from particulates such as silt, sediment, biological matter and bubbles suspended in the water. (*Acoustic Doppler Current Profiler: Principles of Operation: A Practical Primer*, R.D. Instruments, 1996). Estimates of a current's velocity and direction are obtained by processing of the Doppler data.

The Physical Oceanographic Real-Time System (PORTS®), developed in 1989 and used in Tampa Bay, disseminates information on safe navigation, oil spills, search and rescue, fishing and existing weather conditions. (Appell, Gerald F., *The Development of Real Time Port Information System, IEE Journal of Oceanic Engineering*, Vol. 19, No. 2, 1994, pp. 149-157). The PORTS® system employs two measurement stations using ADCPs, other meteorological sensors, and a data acquisition and information dissemination system (DAS/IDS). The ADCPs are located on the bay floor to monitor currents from near the bottom to near the surface and transmit pulses at pre-programmed intervals so that a six-minute reading averages about 345 pulses.

In the Houston Ship Channel, another application of PORTS employs an ADCP system to monitor currents in real time. (Appell, Gerald F. *Design and Tests of Real Time Sontek ADP System, IEE Journal of Oceanic Engineering*, pp. 289-292, 1996). The system uses a profiler specifically designed for shallow water. It is polled on request by a remote station through a serial cable linked to land and data on the current is recorded internally. PORTS® information for the channel is available as recorded voice, online, or both.

A system like PORTS® is used to collect data for hydrodynamic and water quality modeling in New York Harbor. (Coomes, C. A., *Real Time ADCP Current Measurement System for the New York Harbor Area, OCEANS '95*, Conference Proceedings., Vol. 2, pp. 1381-1385, 1995). Data are stored internally and communicated via serial link to a computer in real time.

HADCP is used in a current profiling project in Lillebaelt, Denmark for an inexpensive method of determining flow in narrow navigation passages. A traditional ADCP and a HADCP are used, a two beam ADCP unit validating data from the HADCP device. (Rorbaek, K., *Horizontal Current Profiling in Lillebaelt Denmark, DHI Water & Environment*, 2001).

One approach to alerting a tow pilot to currents around a lock is verbal communication from the lock master. For example, viewing data from an ADCP sensor, the lock master relays information to a tow pilot via VHF radio. Because vessels and the lock are required to communicate during locking, this was considered a viable means of guiding the tow. Data could be transmitted over systems such as wireless Local Area Networks (LAN), radios, and Automatic Identification Systems (AIS). This verbal communication is not "automated" and may occur too late in some situations to be of help to the tow pilot.

Automatic Identification Systems (AIS) comprise radio transponders required by the International Maritime Organization (IMO) for use in certain operating areas. Integrating VHF and GPS technology, AIS provides information concerning vessel Maritime Mobile Service Identity (MMSI) numbers, course, speed, ports of call and the like. (*What is the Automatic Identification System (AIS)?*, U.S. Coast Guard, 2006). Through AIS communication, mariners gain a valuable method by which vessels may exchange data in real time. For example, when overlaid on an electronic chart, ships within 30-50 miles of an AIS-equipped vessel are indicated as a velocity vector.

Provision of the information is automated and made available to a towboat pilot in real time on an electronic chart display as vectors, similar to warnings of vessels in the area. Within the AIS standards, a message format contains both meteorological and hydrologic data, termed "met/hydro" messages. Table 1 lists information that may be contained in these messages. (International Association of Marine Aids to Navigation Lighthouse Authorities (IALA), *IALA Guideline No. 1028 on The Automatic Identification (AIS) Volume 1, Part I Operational Issues*, Edition 1.3, December 2004).

ADCP units are available from several commercial sources. Initially, ADCP units profiled currents vertically from a riverbed or ocean floor. Recently developed ADCP equipment, the Horizontal ADCP (HADCP) is a side-looking device able to measure the velocity and direction of a horizontal current. HADCPs have been used in such diverse applications as deep draft shipping channels and estuaries, oil exploration, and in support of production rigs and power plants. (*Work Horse Horizontal ADCP Operation Manual*, R.D. Instruments, 2004). Neither ADCP nor HADCP has been used to help tow pilots during lock and dam transition until an embodiment of the present invention was tested for that purpose.

TABLE 1

Content of Meteorological and Hydrological Messages.

| Parameter | No. of bits | Description |
|---|---|---|
| Message ID | 6 | Identifier for Message 8; always 8 |
| Repeat Indicator | 2 | Used by the repeater to indicate how many times a msg has been repeated. |
| Source ID | 30 | MMSI number of source station |
| Spare | 2 | Not used. Should be set to zero. |
| IAI | 16 | DAC = 00l; FI = 11 |
| Latitude | 24 | Measuring position, 0 to +/− 90 degrees, 1/1000th minute |
| Longitude | 25 | Measuring position, 0 to +/− 180 degrees, 1/1000th minute |
| Date and time | 16 | Time of transmission, Day, hour, minute, (ddhhmm in UTC) |
| Average wind speed | 7 | Average of wind speed values for the last 10 minutes. 0-120 kts, 1 kt |
| Wind gust | 7 | Wind gust is the maximum wind speed value reading during the last 10 minutes, 0-120 kts, 1 kt |
| Wind direction | 9 | 0-359 degrees, 1 degree |
| Wind gust direction | 9 | 0-359 degrees, 1 degree |
| Air temperature | 11 | Dry bulb temperature −60.0 to +60.0 degrees Celsius 0.1 of a degree |
| Relative humidity | 7 | 0-100%, 1% |
| Dew point | 10 | −20.0-+50.0 degrees, 0.1 degree |
| Air pressure | 9 | 800-1200 hPa, 1 hPa |
| Air pressure tendency | 2 | 0 = steady, 1 = decreasing, 2 = increasing |
| Horizontal visibility | 8 | 0.0-25.0 NM, 0.1 NM |
| Water level (incl. tide) | 9 | Deviation from local chart datum,. −10.0 to +30.0 m 0.1 m |
| Water level trend | 2 | 0 = steady, 1 = decreasing, 2 = increasing |
| Surface current speed (incl. tide) | 8 | 0.0-25.0 kts 0.1 kt |
| Surface current direction | 9 | 0-359 degrees, 1 degree |
| Current speed, #2 | 8 | Current measured at a chosen level below the sea surface, 0.0-25. kts, 0.1 kt |
| Current direction, #2 | 9 | 0-359 degrees, 1 degree |
| Current measuring level, #2 | 5 | Measuring level in m below sea surface,. 0-30 m 1 m |
| Current speed, #3 | 8 | 0.0-25.0 knots, 0.1 knot |
| Current direction, #3 | 9 | 0-359 degrees, 1 degree |
| Current measuring level, #3 | 5 | Measuring level in m below sea surface,. 0-30 m 1 m |
| Significant wave height | 8 | 0.0-25.0 m, 0.1 m |
| Wave period | 6 | Period in seconds, 0-60 s, 1 s |
| Wave direction | 9 | 0-359 degrees, 1 degree |
| Swell height | 8 | 0.0-25.0 m, 0.1 m |
| Swell period | 6 | Period in seconds, 0-60 s, 1 s |
| Swell direction | 9 | 0-359 degrees, 1 degree |
| Sea state | 4 | According to Beaufort scale (manual input?), 0 to 12, 1 |
| Water temperature | 10 | −10.0-+50.0 degrees, 0.1 degree |
| Precipitation (type) | 3 | According to WMO |
| Salinity | 9 | 0.0-50.0%, 0.1% |
| Ice | 2 | Yes/No |
| Spare | 6 | |
| Total Number of bits | 352 | Occupies 2 slots |

A tow pilot uses successive fixes relative to surrounding geographic points, area hydrology and current meteorology. (Hayler, W. B., *American Merchant Seaman's Manual*, 7th edition, 2003). Using nautical charts, the pilot also employs dead reckoning based on present course, distance and speed. The pilot combines successive fixes and dead reckoning plots to adjust course and speed in accordance with external factors such as current, wind, waterway conditions, hazards and the like. Modern towboats have a functional display, typically referred to as an integrated navigation system (INS) or integrated bridge system (IBS), displaying a variety of these navigational resources on a single interface. (Olsen, Oddmund, *Electronic Navigation Systems*, Leknes, Norway: Poseidon, 2002).

Through interface with AIS, radio communications, or other wireless technology, vectors representing current direction and velocity may be projected onto the charts of the INS or IBS to alert tow pilots. For example, communicating the direction and velocity of real-time current data around a lock provides required information for minimizing risk in navigating a lock.

Risks due to outdrafts at dams can be reduced or eliminated by employing a system and method for measuring and communicating outdraft direction and velocity in real time. Preferably the system incorporates commercial-off-the-shelf (COTS) hardware. A system and method for measuring and communicating outdraft velocity and direction was tested on the Tennessee-Tombigbee Waterway at the Tom Bevill Lock and Dam, known to have a strong outdraft upstream of the lock. Testing demonstrated the viability of a system and method for measuring and reporting outdraft measurements at locks as well as potential for its use at bridges and in harbors.

DETAILED DESCRIPTION

Figure 2:
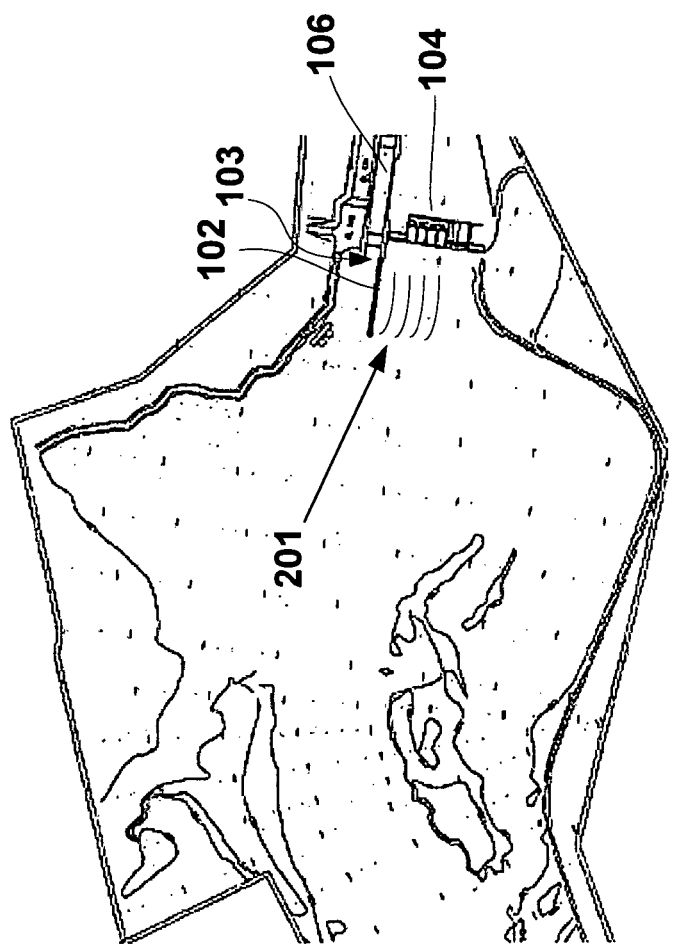
FIG. 2 is a plan view of a representation of the outdraft current from the upstream side of a dam along a prior art Guard wall.
Figure 1:
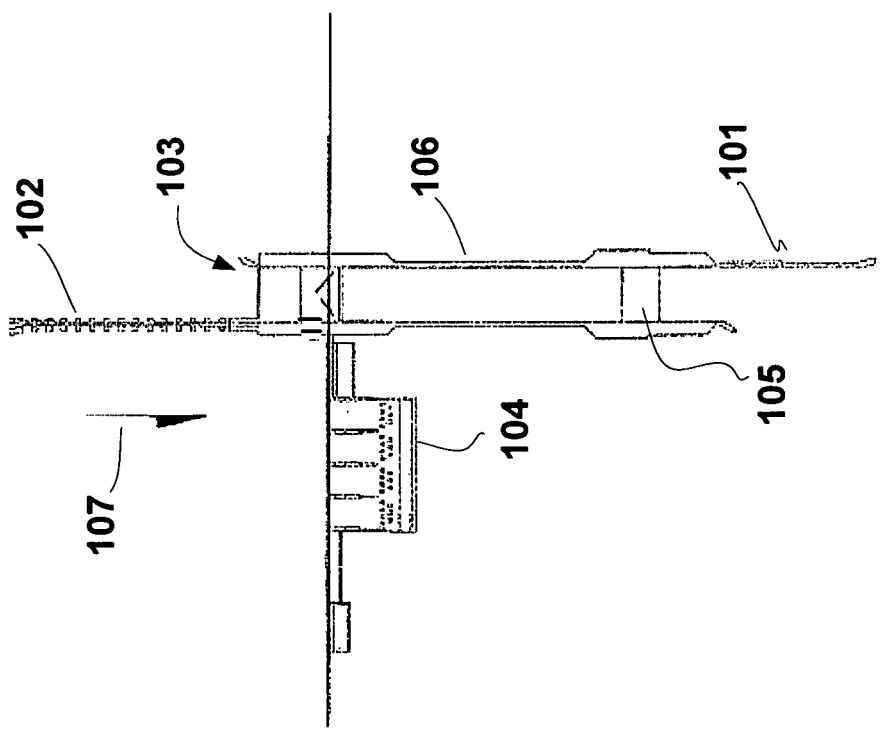
FIG. 1 is a plan view of a typical prior art lock at a dam.

For select embodiments of the present invention, COTS devices are integrated into a system employing specially developed software together with custom hardware and software interfaces to collect and communicate data concerning current flows around fixed structure (e.g., inland locks, bridges, harbor structures and the like) in various bodies of water (e.g., inland waterways, harbors, canals and the like). Select embodiments of the present invention comprise: sensors and communications equipment, for example wireless systems that transmit sensor data to a lock house; lock house communications equipment that receive sensor data; a processor such as a personal computer with installed custom software and interface for processing data, an AIS transponder interfaced to the processor, an AIS installed in an approaching vessel to include an electronic chart display in the vessel, such as in a towboat pilothouse; and an optional web-based database application for lock operators to record dam operation scenarios that may be used for research purposes, investigations, and the like. For example, select embodiments of the present invention provide means for archiving and analyzing outdraft data for research into improvements that will reduce the risk in traversing a lock.

In select embodiments of the present invention, AIS may disseminate automated messages to tow pilots. For example, a transponder may be installed in a lock house to broadcast safety information (e.g., wind direction and speed, outdraft direction and speed, and the like) to tow pilots approaching the lock without interfering with the primary functions of AIS.

In select embodiments of the present invention, a system providing measures of existing environmental conditions near manmade structure proximate navigable portions of bodies of water comprises: one or more sensing means to measure one or more environmental conditions near the manmade structure and to collect data on the condition at pre-specified intervals; one or more communications means connected to the sensing means for retrieving the data; and one or more processing means comprising hardware and software for receiving the data from the communications means and for processing the data for use by a captain of a vessel approaching the man made structure.

In select embodiments of the present invention, the manmade structure comprises a lock that allows safe passage of waterborne vessels in a navigable body of water.

In select embodiments of the present invention, one of the means for sensing comprises one or more Horizontal Acoustic Doppler Current Profiling (HADCP) systems used for collecting data as one or more measures of velocity and direction of horizontal current in the bodies of water proximate one or more portions of the manmade structure.

In select embodiments of the present invention, the sensing means further comprises one or more wind sensors to provide one or more measures of wind velocity and direction as measured near one or more portions of the manmade structure near the body of water.

In select embodiments of the present invention, the communicating means comprises one or more wireless communications systems. In select embodiments of the present invention, the wireless communications systems comprise a first wireless system for communication between one or more of the sensing means and a second wireless system for communicating to one or more vessels preparing to traverse a navigable portion near the manmade structure.

In select embodiments of the present invention, the processing means comprises one or more personal computers configured with custom-developed software for translating data from the means for sensing to a format suitable for use in automatically communicating with a COTS identification system used onboard one or more commercial vessels traversing the navigable portion of the waterway near the manmade structure.

In select embodiments of the present invention, a system provides measures of existing environmental conditions around manmade structure located near navigable portions of bodies of water, comprising: one or more sensors for collecting environmental data at pre-specified intervals; one or more communications systems connected to the sensors; and one or more processors comprising hardware and software for processing the data received from the communications systems connected to the sensors.

In select embodiments of the present invention the sensor comprises one or more Horizontal Acoustic Doppler Current Profiling (HADCP) systems for collecting measures of velocity and direction of horizontal current within the body of water near one or more portions of the manmade structure.

In select embodiments of the present invention the sensors further comprise one or more wind sensors providing data on measures of wind velocity and direction as measured near one or more portions of the manmade structure near the body of water.

In select embodiments of the present invention, the communication system comprises one or more wireless communications systems. In select embodiments of the present invention, the wireless communications system comprises a first wireless system for communication between the sensors and a second wireless system for communicating with vessels preparing to traverse the navigable portion of the body of water near the manmade structure.

In select embodiments of the present invention, the first wireless communication system comprises a Wireless Local Area Network (WLAN) employing the IEEE 802.11g standard and the second wireless communication system comprises one or more VHF radios.

In select embodiments of the present invention, the processor comprises one or more personal computers configured with custom-developed software for translating data from the sensors to a format suitable for use in automatically communicating with a COTS identification system used onboard some commercial vessels traversing the navigable portion of the body of water near the manmade structure.

In select embodiments of the present invention, the COTS identification system is the Automatic Identification System (AIS) approved by the U.S. Coast Guard. In select embodiments of the present invention, the AIS further comprises one or more AIS transponders and one or more vector-based AIS electronic chart displays onboard the vessels.

In select embodiments of the present invention, the processor further comprises one or more interfaces to one or more databases containing data on occurrences related to operation of one or more of the manmade structures.

In select embodiments of the present invention, a method provides measures of existing environmental conditions near manmade structure proximate navigable portions of bodies of water, comprising: providing one or more means for sensing one or more environmental conditions proximate the manmade structure and for collecting data on the condition at pre-specified intervals; providing one or more means for communicating connected to the means for sensing and collecting data; and providing one or means for processing the data, the means for processing receiving data from the means for communicating. The means for processing the data comprises hardware and software.

In select embodiments of the present invention, a method provides measures of existing environmental conditions near manmade structure proximate navigable portions of bodies of water, comprising: providing at least one sensor collecting the measures as data at pre-specified intervals; providing one or more communications systems communicating with the sensors; providing one or more processors comprising hardware and software for processing the data, the processors communicating with the communications system.

In select embodiments of the present invention, a method provides measures of existing environmental conditions near manmade structure proximate navigable portions of bodies of water, comprising: collecting at pre-specified intervals data representing one or more existing environmental condition; communicating the data to one or more processors; converting the data via the processor into a format suitable for use by a COTS identification system; and automatically communicating the converted data to vessels equipped for communication via the COTS identification system as the vessels approach the navigable portions of the body of water near the manmade structure. In select embodiments of the present invention, this method further comprises interfacing with a database containing data on occurrences related to operation of one or more of the manmade structures.

Figure 3:
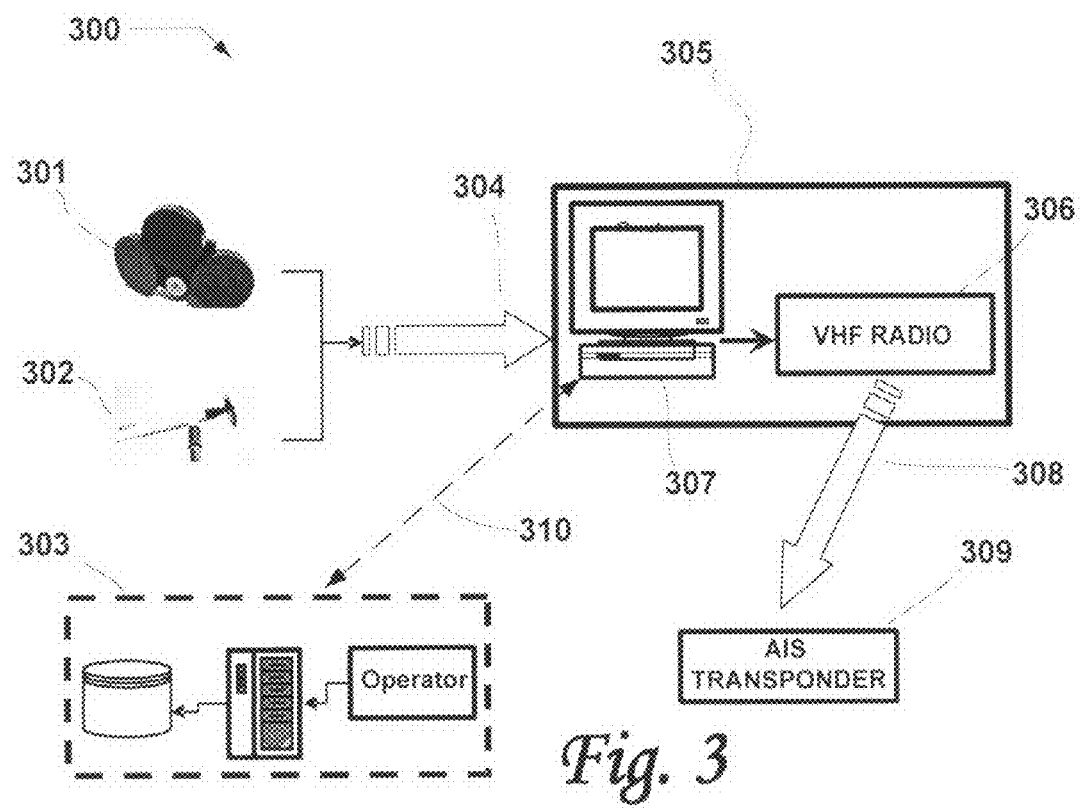
FIG. 3 is a pictorial representation of major components of select embodiments of the present invention.

Refer to FIG. 3, a pictorial representation 300 of major components of select embodiments of the present invention. A HADCP unit 301 and a wind sensor 302, both powered by a power source (not shown separately) are mounted with suitable mounts and connectors on the leading edge of a Guard wall 102 and communications therewith from a control center 305, such as a lock house, is provided by suitable means 304, such as IEEE 802.11g wireless communications equipment. In select embodiments of the present invention, the base (not shown separately) of an underwater mounting structure (not shown separately) houses the HADCP unit 301. The wind sensor 302 is mounted above the HADCP unit 301, preferably on a lock wall, such as a Guard wall 102. Wind parameters are provided because towboats with a significant number of empty barges will be affected by both outdraft and wind.

The instrument (sensor) chosen for the demonstration of a select embodiment of the present invention is an RDI 600 kHz HADCP unit with an acoustic range of 300 feet. (RD Instruments (RDI), 1996). The RDI unit has a narrow beam so that maximum profiling is achieved without the possibility of contamination caused by contact with the river bottom or surface. A third beam accounts for error by determining the differences in velocity between the two outboard beams, while also providing data redundancy and contributing to quality assurance.

The RDI sensor may be powered by AC power distributed to a lock wall, such as the Guard wall 102. A backup power supply (not shown separately) may be employed in the event the lock or dam generators are cycled. In select embodiments of the present invention, only an aluminum mounting bracket (not shown separately) is required, unlike bottom-mounted units in saltwater applications. This bracket may be mounted on an I-beam (not shown separately) that allows for the instrument to be accessed via a winch, e.g., for inspection, upgrading, repair, and the like. The bracket may have safety cables (not shown separately) attached to the lock wall, e.g., a Guard wall 102, for retrieval of the HADCP unit 301 in situations where the unit may have been damaged, e.g., impacted by a passing barge, storm surge, and the like. This configuration has a distinct advantage of not requiring divers for service of the instrument.

As shown in FIG. 3, data from the HADCP unit 301 and wind sensor 302 may be transmitted to the lock house 305 via wireless means 304, such as wireless radios based on the IEEE standard 802.11g. A personal computer (PC) 307 in the lock house 305 uses custom software to convert the data from binary to ASCII format; check the data for quality; compose a series of four met/hydro AIS-formatted messages (one message for each of three water sampling points plus a wind message); log the data to a text file, preferably on the hard drive of the PC 307; and wirelessly transmit 308 the properly formatted data via a VHF radio 306 to an AIS transponder 309, e.g., one located in the wheelhouse of approaching vessels (not shown separately).

In locks operated by the Army Corps of Engineers, a custom web-database application 303 enables lock operators to record flows at the dam 104. In an alternative embodiment, this existing application could be employed to replace a paper-based log that may be used in some embodiments by a link 310 to the existing application 303 from the PC 307. By collecting empirical data on operating conditions and flow data at a dam 104, outdraft current direction and velocity may be able to be correlated with dam operating parameters. Depending on the validity of any relationship developed between dam operation and outdraft parameters, estimates of outdraft 201 may be made with satisfactory confidence levels based on dam operating parameters. This data may be used for further research, investigations and the like, as noted above.

Figure 5:
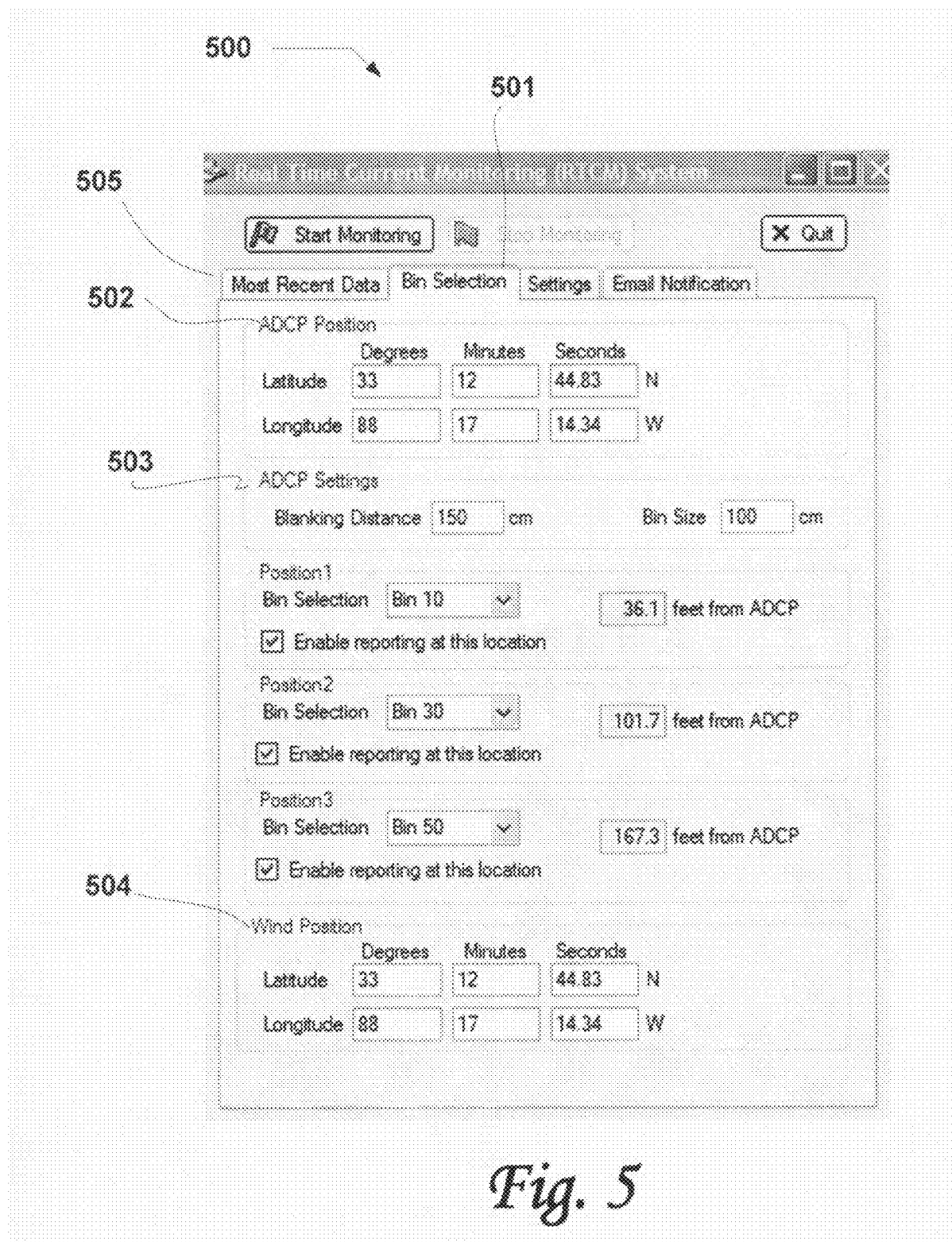
FIG. 5 is a screen capture of an input page for processing software that may be installed on a personal computer employed in select embodiments of the present invention.

The AIS (not shown separately) in the vessel receives data communicated by the VHF radio 306 to an AIS transponder 309, e.g., one located on the bridge of a vessel. Met/hydro messages will display only on vector-based electronic chart systems, thus vessels wishing to utilize the service must be equipped with these. Raster-based charting systems will not display the vectors without modification. Refer to FIG. 5, for a screen capture 500 of how the vectors appear on an electronic charting system such as one incorporated in an AIS.

In select embodiments of the present invention, software programming involves translating packets of binary current data from the HADCP unit 301 and the wind sensor 302 into ASCII format for analysis before messages containing the information are sent to the AIS transponder 309. All sensor data are checked for validity before forwarding to approaching vessels. Sources of error include the presence of vessels and debris in the beam(s) of the HADCP unit 301. These anomalies are indicated by rapid increases in echo and error velocity. For initial conditions, lack of existing data limits the application from establishing and setting thresholds until analysis can be performed on a representative history of operation of the dam 104 and lock after the HADCP unit 301 and wind sensor 302 are installed. Initially, thresholds may be based on suggested values of correlation and error velocity supplied by technical experts and the experience of maritime researchers.

In select embodiments of the present invention, the software detects when the processor is unable to communicate with the sensors 301, 302 and AIS transponder(s) 309, transmitting an e-mail automatically to system providers as an alert. In select embodiments of the present invention, the system may be accessed remotely using terminal services software.

Refer to FIG. 5, a screen capture 500 of an input page for software that may be installed on a PC 307 employed in select embodiments of the present invention. In select embodiments of the present invention, this software is always available to an operator, e.g., a lock operator. The geographic coordinates of the HADCP unit 301 and the wind sensor 302 may be changed as shown at 502, 504, e.g., to support other temporary installations. Further ADCP settings 503 may be changed to meet user requirements and new installation locations. Note that the references to "ADCP position" and "ADCP settings" refer to the HADCP unit 301 installed in select embodiments of the present invention. The Bin Selection tab 501 computes the distance of each selected bin, based on the sensor configuration, i.e., where they are mounted with respect to a known point such as the end of a Guard wall 102. Lock operators may change the selected bins and determine where the resulting data point is located as measured in feet from the mount of the HADCP unit 301. In select embodiments of the present invention, the Most Recent Data tab 505 contains the most recent outdraft current measurements (direction and velocity) available to a lock operator.

EXAMPLE

To demonstrate the ability to quantify outdraft 201 and communicate data in real time to vessels approaching a lock, a system was tested and the concept proved on an actual lock, the Tom Bevill Lock and Dam on the Tennessee-Tombigbee Waterway. The test system incorporated COTS instruments and components and comprises four basic components: sensor and communications equipment for transmitting sensor data to the lock house; communications equipment within the lock house to receive sensor data together with an interfaced PC configured with custom software for processing the data and an AIS transponder interfaced with the computer; an AIS system onboard approaching vessels, including a vector-based AIS electronic chart display in the pilothouse. As an option, a web-based database application may be made available for lock operators to record dam flows that may be correlated with the data taken on outdraft currents for use in research, investigations and the like, as noted above.

This short test demonstrated the viability of an embodiment of the present invention. Moreover, with a modest installation cost and custom software that requires minimal site-specific modification, an embodiment of the present invention may be employed at bridges and in harbors, as well as similar applications.

Figure 4:
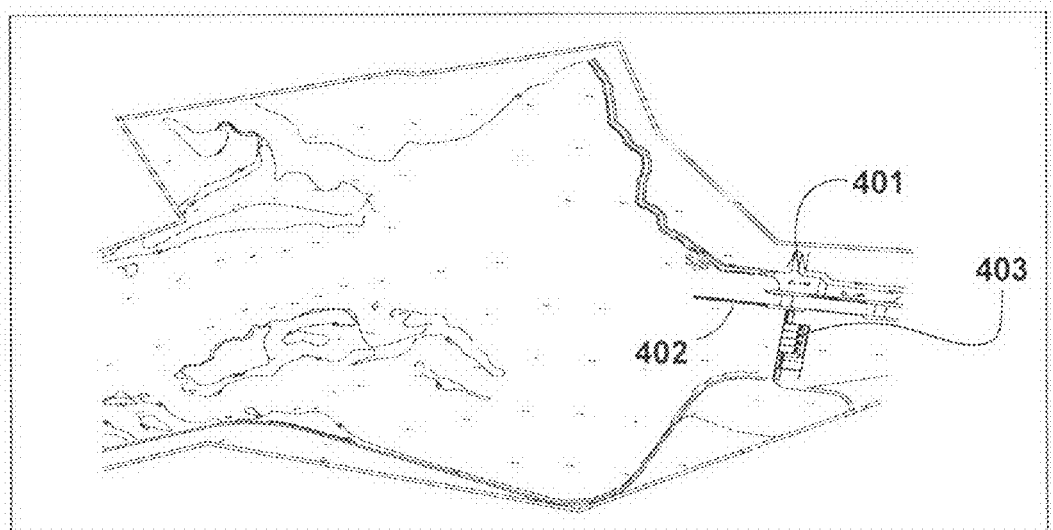
FIG. 4 is a picture of the relative positions of a lock house and installed portions of a select embodiment of the present invention.

Refer to FIG. 4, a pictorial representation from upstream of the Tom Bevill Lock and Dam. An embodiment of the present invention was installed for a short period in a proof-of-concept pilot program at this lock at the end 402 of the Guard wall 102 and in the lock house 401. The two weeks following installation were characterized by a lack of rain. Thus, the dam gates 403 were closed during most of this period and the outdraft current velocity averaged only 0.1 mph. However, the direction of the current 201 was as expected, flowing across the Guard wall 102 toward the dam gates 403 as measured by the HDACP unit 301 mounted at 402.

Figure 6:
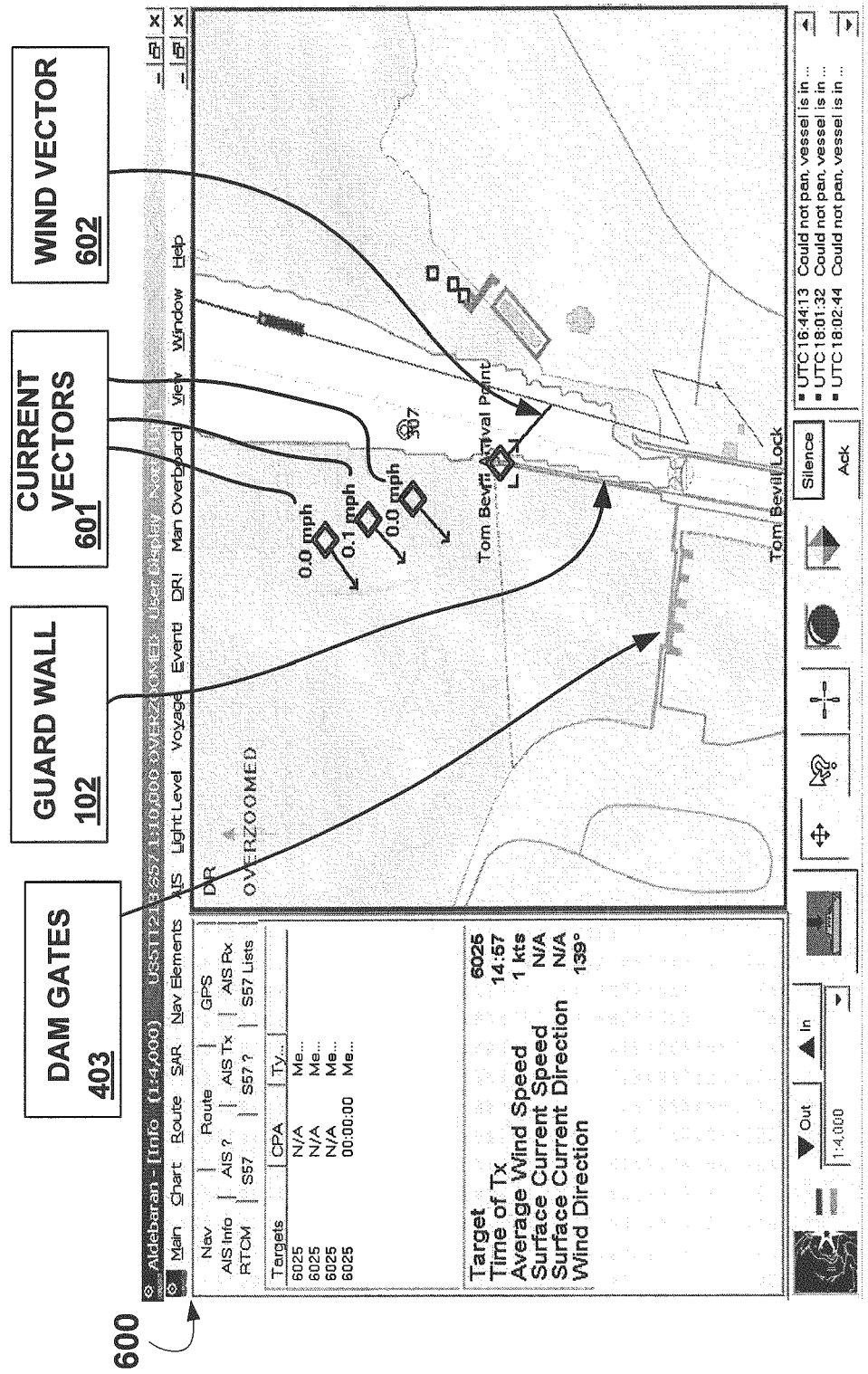
FIG. 6 is a screen capture of a screen onboard an AIS-equipped vessel receiving data from a VHF radio transmitting from a lockhouse.

Refer to FIG. 6, a screen capture 600 of the display of an Electronic Navigation Computer (ENC) (not shown separately) showing the "real time" vectors for current 601 and wind 602. AIS software installed in the lockhouse at Tom Bevill Lock and Dam enabled lock operators to see the current vectors and approaching AIS-equipped vessels, such as towboats. Though very little current was measured at the time, the outdraft direction was as expected, directly toward the dam gates. In select embodiments of the present invention, messages from the lock house to approaching AIS-equipped vessels are generated automatically, approximately once every two minutes. These messages automatically overwrite the last message received, so that AIS-equipped vessels are displaying recent information. In select embodiments of the present invention, messages could be updated at different intervals, e.g., every minute, depending on needs of the user.

Figure 7:
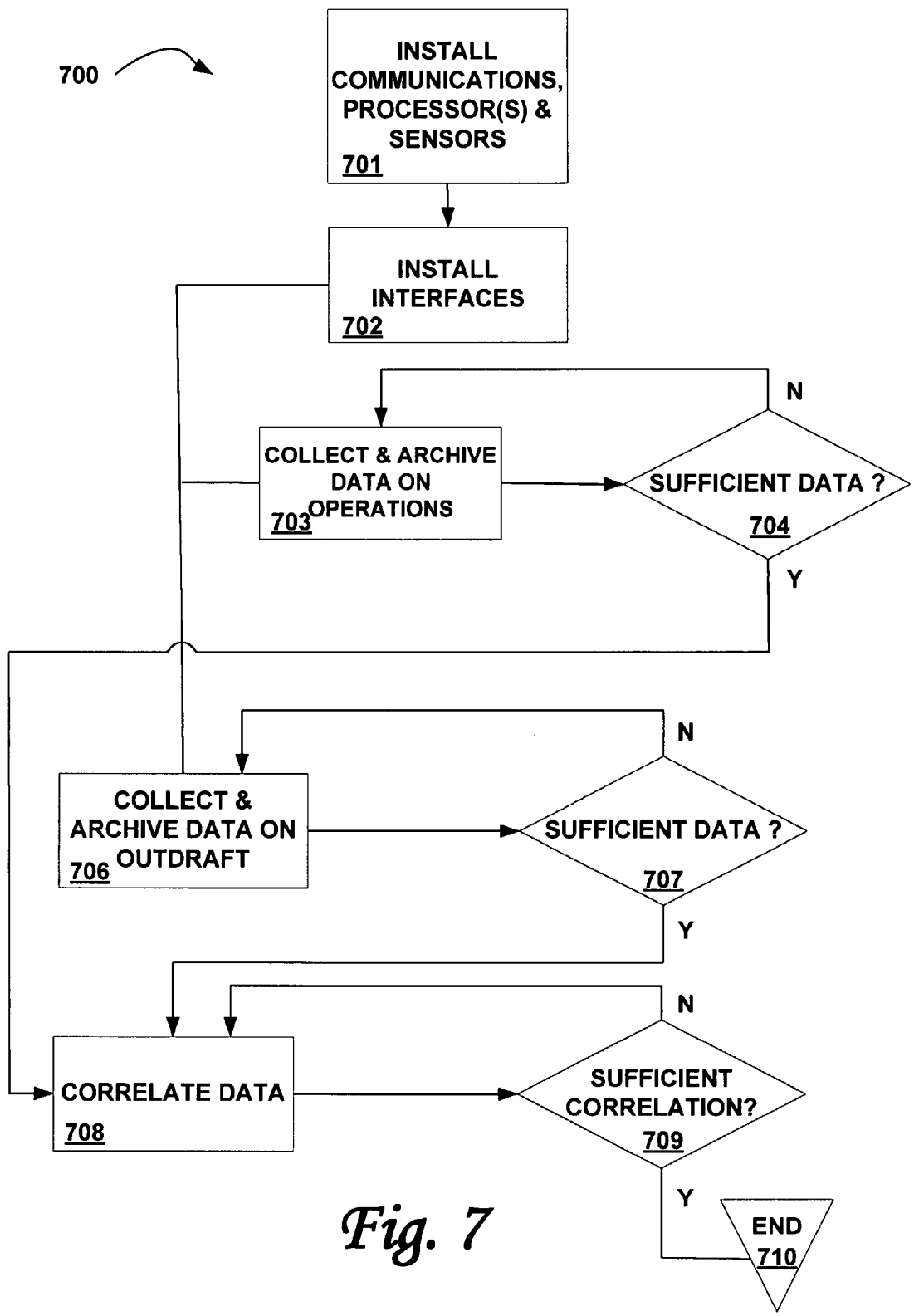
FIG. 7 is a flowchart of a method of employment for select embodiments of the present invention.

Refer to FIG. 7, a flowchart 700 of a method of employment of select embodiments of the present invention. In select embodiments of the present invention, a system comprising suitable sensors, communications and one or more processors is procured and installed 701 at a manmade structure proximate a body of water having navigable sections. As noted above, the manmade structure may be a lock associated with a dam 104 on an inland waterway. The system may comprise a COTS HADCP unit 301, one or more wind sensors 302, wireless communications including wireless radios 304 based on the IEEE standard 802.11g, a VHF radio 306, a PC 307 and custom software, and necessary interfaces 702 installed between the various components.

Once installed, operations data are collected and archived 703 on the operation of the dam 104 and a determination 704 made as to whether sufficient operations data have been collected and archived to represent all expected variations in operation of the dam 104. If so, these data may be correlated 708 with data collected and archived 706 on outdraft 201, given that sufficient data are determined 707 to have been collected on outdraft 201 at sufficient representative operations cycles of the dam 104. If sufficient data are available for correlation 709, then this part of the method of employment may be ended 710. Data thus collected and archived may be used or research, investigations, and the like.

The abstract of the disclosure is provided to comply with the rules requiring an abstract that will allow a searcher to quickly ascertain the subject matter of the technical disclosure of any patent issued from this disclosure. Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples used at inland waterway locks, embodiments of the present invention are useful for measuring currents in bays and harbors as well as inlets and outlets to large lakes and water impoundments. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

We claim:

1. A system to automatically provide pilots of vessels in navigable portions of bodies of water with measures of existing environmental conditions near manmade structure proximate said navigable portions of bodies of water, comprising:
    at least one means for sensing at least one environmental condition proximate said manmade structure and for collecting data on said at least one environmental condition at pre-specified intervals;
    at least one first means for communicating in operable communication with at least said at least one means for sensing and collecting data; and
    at least one means for processing at least some of said data, said at least one means for processing in operable communication with at least said at least one first means for communicating,
  wherein said at least one means for processing comprises hardware and software; and
    at least one second means for communicating in operable communication with at least said at least one means for processing,
  wherein said at least one second means for communicating automatically provides said pilots of vessels with said measures of existing environmental conditions near said manmade structure proximate said navigable portions of bodies of water and updates thereto at pre-specified intervals.

2. The system of claim 1 in which said manmade structure comprises a lock permitting passage of waterborne vessels.

3. The system of claim 1 in which said at least one means for sensing comprises at least one Horizontal Acoustic Doppler Current Profiling (HADCP) system,
    wherein said at least one Horizontal Acoustic Doppler Current Profiling (HADCP) system collects said data as at least one measure of velocity and direction of horizontal current in said navigable portions of bodies of water, said horizontal current proximate at least one portion of said manmade structure.

4. The system of claim 3 in which said at least one means for sensing and collecting data further comprises at least one wind sensor, wherein said at least one wind sensor provides at least one measure of at least wind velocity and direction as measured proximate said at least one portion of said manmade structure.

5. The system of claim 1 in which said at least one second means for communicating comprises at least one first wireless communications system.

6. The system of claim 5 in which said one second means for communicating further comprises at least one second wireless communications system for automatically communicating between said means for processing and at least one of said pilots of vessels preparing to traverse at least one said navigable portion of said bodies of water near said manmade structure.

7. The system of claim 1 in which said at least one means for processing comprises at least one personal computer configured with custom-developed software for translating data from said at least one means for sensing and collecting data to a format for use in automatically communicating with a Commercial Off the Shelf (COTS) identification system used onboard at least some said vessels traversing at least one said navigable portion of said bodies of water.

8. A system to automatically provide pilots of vessels in navigable portions of bodies of water with measures of existing environmental conditions near manmade structure proximate said navigable portions of bodies of water, comprising:
    at least one sensor collecting said measures of existing environmental conditions near manmade structure proximate navigable portions of bodies of water as data at pre-specified intervals;
    at least one first communications system in operable communication with at least said at least one sensor; and
    at least one processor to process at least some of said data, said at least one processor in operable communication with said at least one first communications system,
    wherein said at least one processor comprises hardware and software; and
    at least one second communications system in operable communication with at least said at least one processor,
  wherein said at least one second communications system automatically provides said pilots of vessels with said measures of existing environmental conditions near said manmade structure proximate said navigable portions of bodies of water, and updates thereto at pre-specified intervals.

9. The system of claim 8 in which said manmade structure comprises a lock permitting passage of waterborne vessels.

10. The system of claim 8 in which said at least one sensor comprises at least one Horizontal Acoustic Doppler Current Profiling (HADCP) system, wherein said at least one Horizontal Acoustic Doppler Current Profiling (HADCP) system collects at least one measure of velocity and direction of horizontal current within said bodies of water proximate at least one portion of said manmade structure.

11. The system of claim 10 in which said at least one sensor further comprises at least one wind sensor,
    wherein said at least one wind sensor provides at least one measure of at least wind velocity and direction as measured proximate said at least one portion of said manmade structure proximate navigable portions of bodies of water.

12. The system of claim 8 in which said at least one second communications system comprises at least one first wireless communications system.

13. The system of claim 12 in which said at least one second communications system comprises at least one second wireless communications system for automatically communicating from said at least one processor to at least one of said pilots of vessels in navigable portions of bodies of water preparing to traverse at least one said navigable portion of said bodies of water near said manmade structure.

14. The system of claim 13 in which said at least one first wireless communications system comprises a Wireless Local Area Network (WLAN) and said at least one second wireless communications system comprises at least one VHF radio.

15. The system of claim 8 in which said at least one processor comprises at least one personal computer configured with custom-developed software for translating said data from said at least one sensor to a format for use in automatically communicating with a Commercial Off the Shelf (COTS) identification system used onboard at least some said vessels traversing at least one said navigable portion of said bodies of water near said manmade structure.

16. The system of claim 15 in which at least part of said COTS identification system operates within the VHF frequency range.

17. The system of claim 16 in which said COTS identification system further comprises at least one transponder and one vector-based electronic chart display onboard said vessels traversing at least one said navigable portion of said bodies of water near said manmade structure.

18. The system of claim 8 in which said at least one processor further comprises at least one interface to at least one database,
    wherein occurrences related to operation of at least one said manmade structure are input to said at least one database.

19. A method for automatically providing pilots of vessels in navigable portions of bodies of water with measures of existing environmental conditions near manmade structure proximate navigable portions of bodies of water, comprising:
    measuring, via at least one means for sensing, at least one environmental condition proximate said manmade structure;
    collecting data on said measured at least one environmental condition, said collected data taken at pre-specified intervals;
    communicating, via at least one first communications system, to at least one processor said collected data on said measured at least one environmental condition taken at pre-specified intervals;
    processing at least some said collected data on said measured at least one environmental condition taken at pre-specified intervals with at least one processor, said at least one processor in operable communication with at least one said at least one first communications system,
    wherein said at least one processor comprises hardware and software; and
        communicating automatically to said pilots of vessels, via at least one second communications system, said measures of existing environmental conditions near said manmade structure proximate said navigable portions of bodies of water, and updates thereto at pre-specified intervals.

20. A method for automatically providing pilots of vessels in navigable portions of bodies of water with measures of existing environmental conditions near manmade structure proximate navigable portions of bodies of water, comprising:
    providing at least one sensor for collecting said measures of existing environmental conditions near manmade structure proximate navigable portions of bodies of water as data at pre-specified intervals;
    providing at least one first communications system operably communicating with at least said at least one sensor;
    providing at least one processor, comprising hardware and software, for processing at least some of said data, said at least one processor operably communicating with at least one said at least one first communications system; and
    providing at least one second communications system in operable communication with at least said at least one processor,
wherein said at least one second communications system automatically provides said pilots of vessels with said measures of existing environmental conditions near said manmade structure proximate said navigable portions of bodies of water, and updates thereto at pre-specified intervals.

* * * * *